US011475410B1

(12) United States Patent
Studer et al.

(10) Patent No.: US 11,475,410 B1
(45) Date of Patent: Oct. 18, 2022

(54) USING AN AUTOMATED SCHEDULING AGENT TO GENERATE EVENTS AND COORDINATE SCHEDULES

(75) Inventors: Scott D. Studer, Georgetown, MA (US); Jonathan Baird Homer, Newburyport, MA (US)

(73) Assignee: Eventuality, Inc., Annapolis, MD (US)

( * ) Notice: Subject to any disclaimer, the term of this patent is extended or adjusted under 35 U.S.C. 154(b) by 1306 days.

(21) Appl. No.: 11/383,730

(22) Filed: May 16, 2006

Related U.S. Application Data

(60) Provisional application No. 60/722,972, filed on Oct. 4, 2005, provisional application No. 60/681,148, filed on May 16, 2005.

(51) Int. Cl.
*G06Q 10/10* (2012.01)
(52) U.S. Cl.
CPC .................................. *G06Q 10/109* (2013.01)
(58) Field of Classification Search
CPC ...... G06Q 10/063; G06Q 10/06; G06Q 10/10; G06Q 10/0631; G06Q 30/02
See application file for complete search history.

(56) References Cited

U.S. PATENT DOCUMENTS

| | | | | |
|---|---|---|---|---|
| 5,093,901 | A * | 3/1992 | Cree et al. | 715/753 |
| 6,108,640 | A * | 8/2000 | Slotznick | G06Q 20/102 |
| | | | | 705/40 |
| 6,732,103 | B1 * | 5/2004 | Strick | G06Q 10/109 |
| 2001/0049637 | A1 * | 12/2001 | Tso | G06Q 30/02 |
| | | | | 705/26.8 |
| 2002/0131565 | A1 * | 9/2002 | Scheuring | G06Q 10/109 |
| | | | | 379/88.19 |
| 2003/0027558 | A1 * | 2/2003 | Eisinger | G06Q 10/109 |
| | | | | 455/414.1 |
| 2003/0204474 | A1 * | 10/2003 | Capek | G06Q 10/109 |
| | | | | 705/64 |

(Continued)

FOREIGN PATENT DOCUMENTS

EP  1162790 A2 * 12/2001 ......... H04L 43/0882

OTHER PUBLICATIONS

Goyanes, Vanessa. Software: Online Organization for Event Planning. BizBash. Date: Jul. 21, 2005. https://www.bizbash.com/production-strategy/event-management/article/13224225/software-online-organization-for-event-planning (Year: 2005).*

(Continued)

*Primary Examiner* — Patricia H Munson
*Assistant Examiner* — Nancy N Prasad
(74) *Attorney, Agent, or Firm* — Fish & Richardson P.C.

(57) ABSTRACT

An event may be scheduled by establishing a connection between an event initiator and an automated scheduling agent, receiving an instruction from the event initiator to generate an event, interrogating the event initiator to identify one or more invitees for an event, referencing contact information for each of the invitees, using the automated scheduling agent to contact the invitee with a message that elicits invitee availability, using the automated scheduling agent to receive a response to the message that includes a set of two or more potential times for the event, relating the response of at least some members of the group that includes the invitee and the event initiator, and in response to relating the response from the more than two of the group, scheduling a event.

20 Claims, 19 Drawing Sheets

(56) References Cited

U.S. PATENT DOCUMENTS

2004/0003042 A1* 1/2004 Horvitz ............... G06Q 10/109
709/204
2007/0005406 A1* 1/2007 Assadian ........... G06Q 10/1093
705/7.18

OTHER PUBLICATIONS

Reference Goyanes, Vanessa. Software: Online Organization for Event Planning. BizBash. Date: Jul. 21, 2005. https://www.bizbash.com/production-strategy/event-management/article/13224225/software-online-organization-for-event-planning (Year: 2006).*
Microsoft Office, Microsoft Office Outlook 2003 Product Guide, 2004, pp. 1-73.
Microsoft Appointment Manager, Appointment Manager for online scheduling from Microsoft Small Business, reprinted on May 16, 2006 from http://www.microsoft.com/smallbusiness/online/scheduling/appointment-manager/detail.mspx?pf=true, pp. 1-72.
PeopleCube,Meeting Maker, Meeting Maker, calendar software that simplifies meeting scheduling, reprinted on May 16, 2006 from http://www.meetingmaker.com/products/meetingmaker/default.cfm, pp. 1-17.
Trumba, Trumba-Website Calendars-Event Calendars, reprinted on May 16, 2006 from http://www.trumba.com/corp/default.aspx, pp. 1-12.
AppointmentQuest, Online Appointment Manager, AppointmentQuest Online Scheduling Software, www.apointmentquest.com, pp. 1-5.
ConnectMe, LLC, ConnectMeVoice, reprinted on May 16, 2006 from http://siteb.connectmevoice./land_followme.htm?s=gaw&kw=find+me+follow, pp. 1-2.

* cited by examiner

| | |
|---|---|
| SYSTEM: | "Good morning, John Doe." |
| JOHN DOE: | "New Event" |
| SYSTEM: | "What is your event?" |
| JOHN DOE: | "Golf" |
| SYSTEM: | "How long will your event take?" |
| JOHN DOE: | "Two hours" |
| SYSTEM: | "When is the earliest you would like your event to start?" |
| JOHN DOE: | "Monday at 8:00 AM" |
| SYSTEM: | "When is the latest you would like your event to finish?" |
| JOHN DOE: | "Monday at 5:00 PM" |
| SYSTEM: | "Would you like to record a personal message to the invitees?" |
| JOHN DOE: | "Yes" |
| SYSTEM: | BEEP |
| JOHN DOE: | "Anyone up for a round? Go Red Sox!" |
| SYSTEM: | "Do you have any mandatory attendees?" |
| JOHN DOE: | "Yes" |
| SYSTEM: | "Who?" |
| JOHN DOE: | "jane@doe.com" |
| SYSTEM: | "Do you have any additional mandatory attendees?" |
| JOHN DOE: | "Yes" |
| SYSTEM: | "Who?" |
| JOHN DOE: | "999 999 9999" |
| SYSTEM: | "Do you have any additional mandatory attendees?" |
| JOHN DOE: | "No" |
| SYSTEM: | "Do you have any optional attendees?" |
| JOHN DOE: | "No" |
| SYSTEM: | "John, say error as soon as you hear any errors in the following summary of your event. Golf for two hours on Monday between 8:00 AM and 5:00 PM with jane@doe.com and 999 999 9999" |
| SYSTEM: | "I will notify you when I have confirmed the event time and attendees" |

FIG. 8

---- Original Message ----

From: JonHomer@MyCompany.com

To: EventManager@eventuality.us

Sent: Wednesday, May 04, 2005 4:20 PM

Subject: New Event

Event Title: Golf

Event Location: Pine Meadows Golf Course

Duration: 4 hours

Time Frame: Monday, 0800-1200

Time Frame: Tuesday, 0800-1200

Participant: Jane Doe

Contact Information: Jane@doe.com

Participant: John Doe

Contact Information: (123)-456-7890

Personal Message: Anyone up for a quick 18 holes?

FIG. 9

| | |
|---|---|
| SYSTEM: | "Anyone up for a round of golf? Go Red Sox" |
| SYSTEM: | "This is the eventuality service attempting to coordinate a golf event for four hours on Monday, March 1st or Tuesday, March 2nd with John Doe. Are you interested in attending?" |
| JOHN DOE: | "Yes" |
| SYSTEM: | "Do you have any conflicts on Monday, March 1st?" |
| JOHN DOE: | "No" |
| SYSTEM: | "Please indicate a preference for this time period by saying High, Medium, or Low" |
| JOHN DOE: | "High" |
| SYSTEM: | "Do you have any conflicts on Tuesday, March 2nd?" |
| JOHN DOE: | "Yes" |
| SYSTEM: | "Are there any available times on Tuesday, March 2nd?" |
| JOHN DOE: | "Yes" |
| SYSTEM: | "Please indicate the earliest time that you are available on Tuesday, March 2nd" |
| JOHN DOE: | "Eleven thirty AM" |
| SYSTEM: | "For the time period beginning at eleven thirty AM, please indicate when your availability ends" |
| JOHN DOE: | "Five PM" |
| SYSTEM: | "Please indicate a preference for this time period by saying High, Medium, or Low" |
| JOHN DOE: | "Low" |
| SYSTEM: | "Do you have any other available times on Tuesday, March 2nd?" |
| JOHN DOE: | "No" |
| SYSTEM: | "Thank you. I will confirm your scheduled event time once I have coordinated all of the participants' schedules." |
| JOHN DOE: | "Yes" |

FIG. 10

|   |   | Time Frame Preference | | | | |
|---|---|---|---|---|---|---|
|   |   | High | Medium | Low | Not Available | Unknown (no response) |
| Participant Importance | Critical | 0 | 20 | 30 | 50 | 50 |
|   | High | 0 | 10 | 20 | 30 | 25 |
|   | Medium | 0 | 5 | 10 | 20 | 15 |
|   | Low | 0 | 0 | 5 | 10 | 5 |

| Participant | Preference | | | Value | Total |
|---|---|---|---|---|---|
|   | High | Medium | Low |   |   |
| Critical #1 | X |   |   | 0 |   |
| High #1 |   | X |   | 10 |   |
| High #2 |   | X |   | 10 |   |
| Medium #1 |   | X |   | 5 | 45 |
| Medium #2 |   |   | X | 10 |   |
| Low #1 |   |   | X | 5 |   |
| Low #2 |   |   | X | 5 |   |

| Participant | Preference | | | Value | Total |
|---|---|---|---|---|---|
|   | High | Medium | Low |   |   |
| Critical #1 |   | X |   | 20 |   |
| High #1 |   | X |   | 10 |   |
| High #2 |   | X |   | 10 |   |
| Medium #1 |   | X |   | 5 | 45 |
| Medium #2 | X |   |   | 0 |   |
| Low #1 | X |   |   | 0 |   |
| Low #2 | X |   |   | 0 |   |

| Participant | Preference | | | Value | Total |
|---|---|---|---|---|---|
|   | High | Medium | Low |   |   |
| Critical #1 |   |   | X | 30 |   |
| High #1 |   | X |   | 10 |   |
| High #2 |   | X |   | 10 |   |
| Medium #1 |   | X |   | 5 | 45 |
| Medium #2 | X |   |   | 0 |   |
| Low #1 | X |   |   | 0 |   |
| Low #2 | X |   |   | 0 |   |

NEW APPOINTMENT

TYPE: 60 MINUTE MESSAGE

START: 10:00 AM   15 MAY 2006

DURATION: 60 MINUTES

QUESTION FOR CUSTOMER: DO YOU HAVE ANY RELEVANT MEDICAL CONDITION?

NOTIFICATION: ACCOUNT OWNER

☐ PHONE  ☒ EMAIL  ☐ SMS

SAVE

EDIT APPOINTMENT TEMPLATE

1800

TEMPLATE NAME: [DEFAULT TEMPLATE]

DEFAULT DURATION: [30] (MINUTES)

DEFAULT QUESTION FOR CUSTOMER: DO YOU HAVE ANY SPECIAL INSTRUCTIONS?

DEFAULT NOTIFICATION: WHEN CONFIRMED, NOTIFY: [ACCOUNT OWNER ▼]
☐ PHONE  ☒ EMAIL  ☐ SMS

[SAVE AND CLOSE]  [DELETE]  [CANCEL]

| | SUN | MON | TUE | WED | THUR | FRI | SAT |
|---|---|---|---|---|---|---|---|
| | | | | | | | 1 |
| 2 | | 3 | 4 | 5 | 6 Grub Control Lawn Care Lawn Care | 7 Aeration Aeration Weed Control Pool Cleaning Aeration | 8 Weed Control Weed Control |
| 9 | | 10 Lawn Care Lawn Care Weed Control Grub Control Spring Cleaning | 11 Lawn Care Lawn Care Lawn Care Lawn Care | 12 Lawn Care Lawn Care Lawn Care Pool Cleaning Aeration | 13 Pool Cleaning Pool Cleaning Lawn Care Lawn Care Lawn Care | 14 Lawn Care Lawn Care Lawn Care Weed Control Weed Control More... | 15 Lawn Care Grub Control Weed Control |
| 16 | | 17 Lawn Care Weed Control Driveway Edging | 18 | 19 Lawn Care | 20 | 21 Lawn Care | 22 |
| 23 Lawn Care Lawn Care Lawn Care Lawn Care | | 24 | 25 Lawn Care Lawn Care Lawn Care | 26 | 27 Lawn Care | 28 Jon Appointment | 29 Lawn Care Lawn Care Lawn Care |
| 30 | | | | | | | |

FIG. 19

USING AN AUTOMATED SCHEDULING AGENT TO GENERATE EVENTS AND COORDINATE SCHEDULES

CROSS-REFERENCE TO RELATED APPLICATIONS

This application claims priority to U.S. Provisional Application No. 60/681,148, filed May 16, 2005, and entitled "Multimode Event Coordination", and U.S. Provisional Application No. 60/722,972, filed Oct. 4, 2005, and also entitled "Multimode Event Coordination. Each of these applications is coordinated by reference.

TECHNICAL FIELD

This document relates to event coordination and establishment.

BACKGROUND

A user may manage calendaring system to manage a schedule.

DESCRIPTION OF DRAWINGS

FIG. 8 is dialog demonstrating an exemplary process by which an event may be created via telephone or other voice communications system.

FIG. 9 is an exemplary electronic event creation message using keywords to identify important event description fields.

FIG. 10 is dialog demonstrating an exemplary process of querying an invitee for availability.

FIG. 11 are exemplary tables with availability/preference values that may be used to establish an event.

FIGS. 16 and 17 are exemplary graphical user interfaces that may be used to configure a new appointment and a new communication.

FIG. 18 is an exemplary template that may be used to configure an appointment being managed through an automated scheduling agent.

FIG. 19 is an exemplary calendar indicating which appointments have been scheduled using an automated scheduling agent.

DETAILED DESCRIPTION

Figure 1:
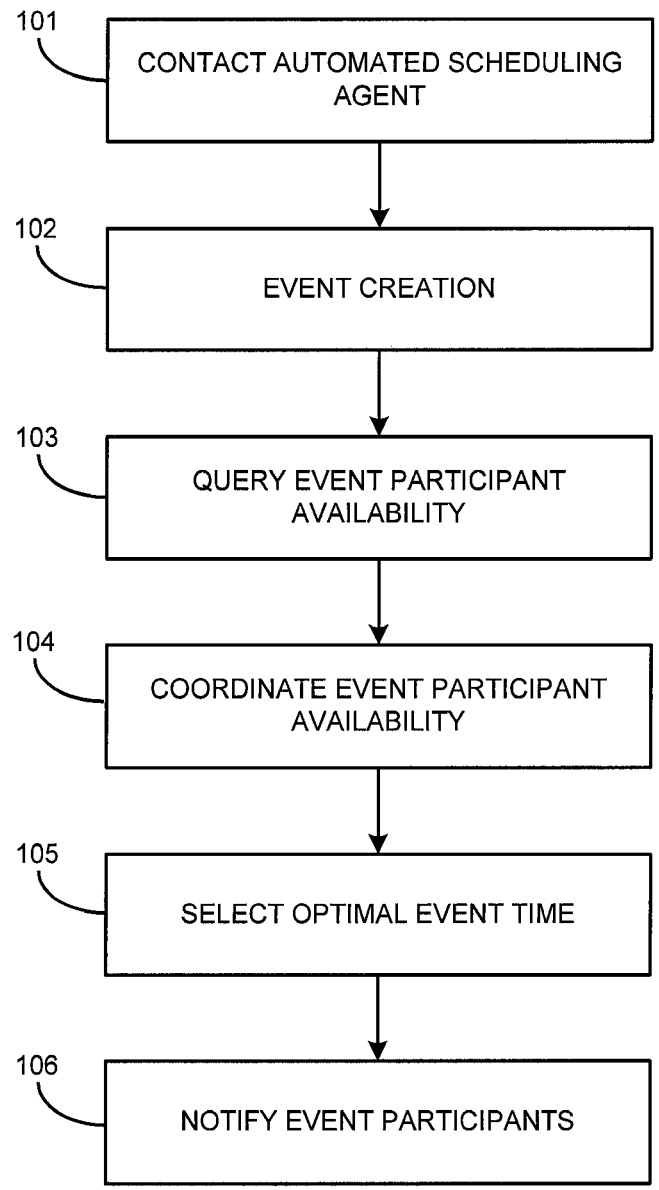
FIG. 1 is a flow chart of an exemplary process by which an event may be scheduled.

Managing events and schedules can be a complex undertaking. For example, an individual may find it difficult to identify a time for a conference that is mutually convenient or even available for each of several conference invitees, particularly where the individual is coordinating different windows of availability for several people. The burden of coordinating schedules is oftentimes so great that participation rates are reduced, or even cancelled altogether. Businesses may experience even greater challenges where revenue opportunities are predicated on operating at maximum efficiency. The inability to collect revenue from cancelled or unused appointments and/or the inability to assemble required teams are examples of problems that can result from less-than-adequate scheduling systems.

To enable better management of events and schedules, an automated scheduling agent may be used. More precisely, an event may be scheduled by establishing a connection between an event initiator and an automated scheduling agent. For example, a user may use a wireless telephone to connect to a telephony interface for an automated scheduling agent. The automated scheduling agent receives an instruction from the event initiator to generate an event.

In one example, a user requests to schedule a board meeting. The event initiator is interrogated to identify one or more invitees for the board meeting. In scheduling the board meeting, the user requests to invite all board members. Contact information for each of the invitees is referenced and the automated scheduling agent is used to contact the invitees with a message that elicits invitee availability. Thus, for instance, each of the board members receives a call from an automated interactive voice response system that determines member availability. The automated scheduling agent receives a response to the message that includes a set of two or more potential times for the event. For example, each of the board members may provide a set of available times when they are personally available.

Responses are related, including responses from at least some members of a group that includes at least one invitee and the event initiator. The proposed availabilities may be analyzed to achieve certain attendance preferences as requirements. In the above case of a board meeting, availability of the invitees is analyzed to ensure the quorum is present as a prerequisite to identify a time slot as available. In response to relating the response from the more than two (or other minimum requirement) of the group, an event is scheduled. In the ongoing example, a board meeting may be scheduled for the time slot that enables the highest level of board member participation, the most immediate opportunity for a quorum or some number greater than a quorum (to account for likely absence of respondents), or some other criteria specifiable by the event initiator or in association with meeting type (e.g., a system designed with rules to elicit specification of rules as other criteria for certain types of meeting or events).

FIG. 1 is a flow chart of an exemplary process by which an event may be scheduled. The exemplary operations are then further decomposed into additional operations that may be executed as shown.

Contacting the Automated Scheduling Agent

Figure 2:
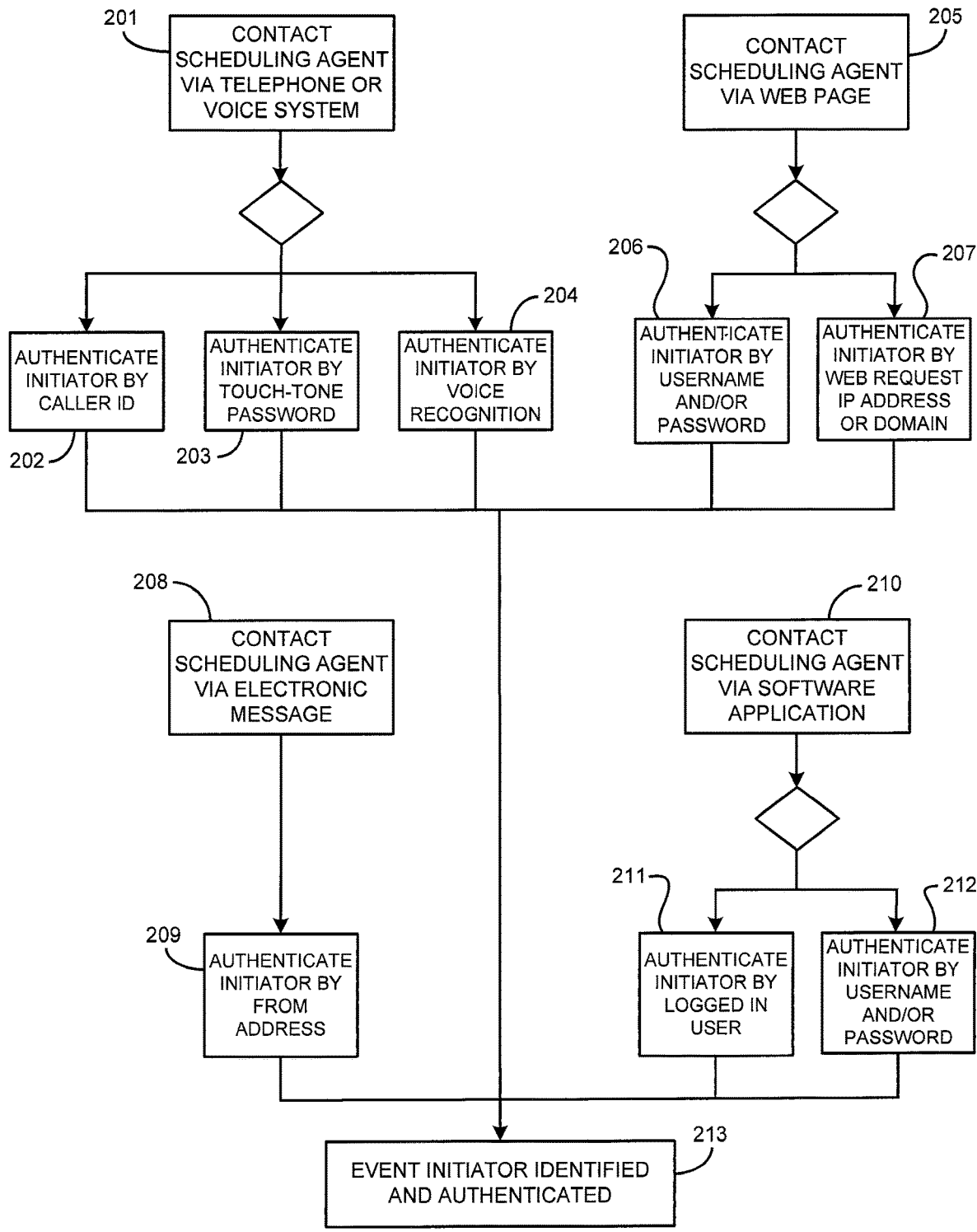
FIG. 2 is a flow chart of an exemplary process by which an automated scheduling agent contacts and authenticates the event initiator.

The first operation in scheduling an event is contacting the automated scheduling agent (101), an example of which process is described in greater detail with respect to FIG. 2. The automated scheduling agent may include software that resides on a server. The server may be local (a computer that the event initiator has direct physical access to) or remote (a computer connected over some network such as a Local Area Network, the Internet, the Public Switched Telephone Network, etc.).

The automated scheduling agent may be accessed through a variety of media including, but not limited to, telephones (e.g., a wireless phone), web pages, software applications, and electronic messaging (e.g., Email, Instant Message, SMS ("Short Message Service"), or Text Message). The event initiator may be identified by the automated scheduling agent responsive to the media that was used to initiate event scheduling. An event initiator may use different media to schedule subsequent events and separate event initiators may use different access techniques to schedule unique events simultaneously.

If the event initiator contacts the automated scheduling agent via telephone or other voice system (201), the event initiator may be identified by the caller ID of the incoming phone call placed by the event initiator to the scheduling agent (202), by a touch-tone password entered by the event initiator (203), and/or by recognition of the event initiator's voice (204).

If the event initiator contacts the automated scheduling agent via web page (205), the event initiator may be identified through their entry of a username and/or password (206), by the identity of the web request originator (207) using domain information, in an IP address, and/or other identifier.

If the event initiator contacts the automated scheduling agent via electronic message (208), the event initiator may be identified, for example, by the "From" address of the message (209).

If the event initiator contacts the automated scheduling agent via software application (210), the event initiator may be identified by the currently logged-in computer account (211) and/or by their entry of an additional username and/or password (212).

As a result of contacting the automated scheduling agent, the event initiator has been identified by the automated scheduling agent (213).

Event Creation

Figure 3:
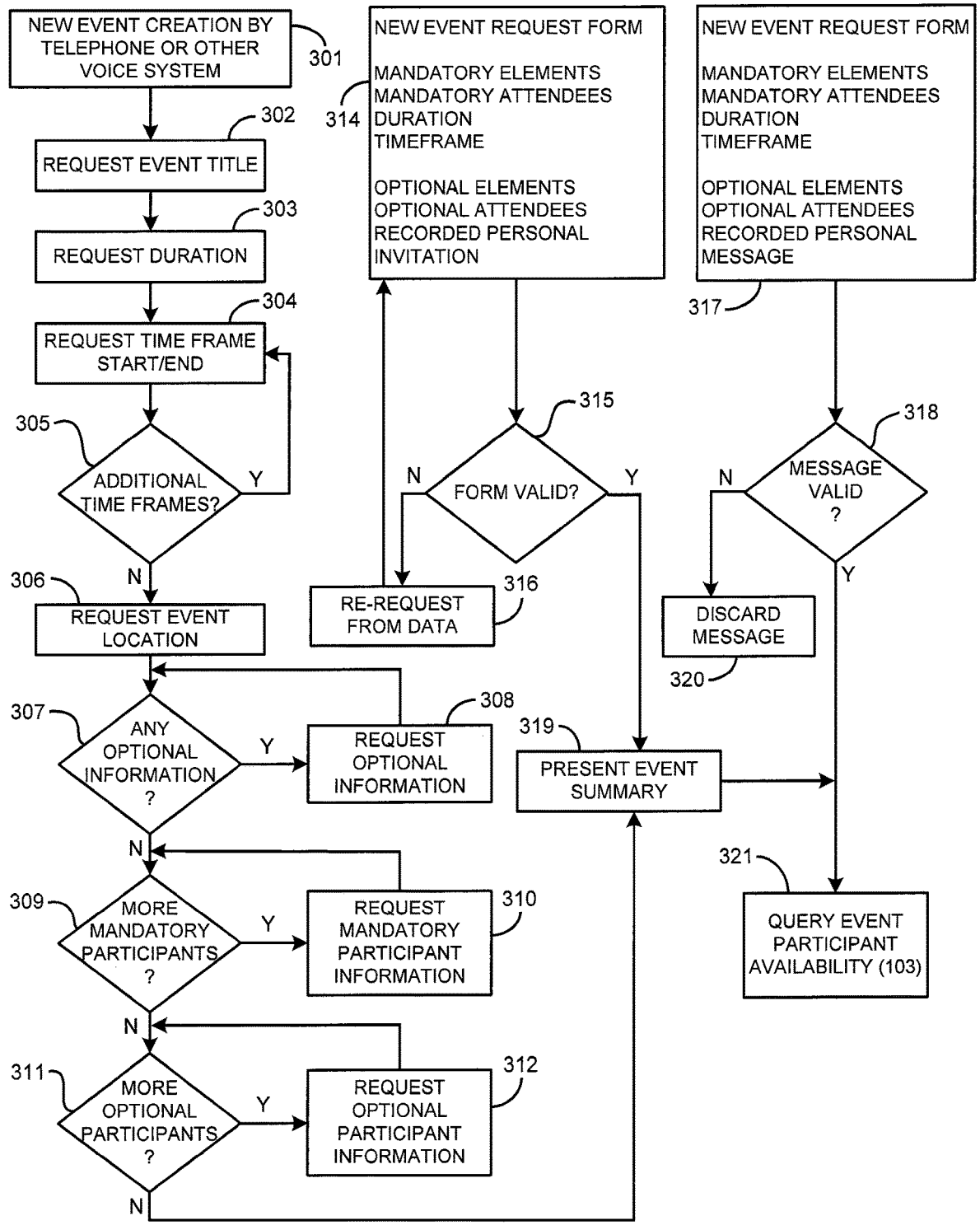
FIG. 3 is a flow chart of an exemplary process by which information descriptive of an event is provided so that the automated scheduling agent may establish an event.

The second operation in scheduling an event is event creation (102), an example of which is described in further detail with respect to FIG. 3. During this operation, the automated scheduling agent collects from the event initiator the information necessary to create a new event.

The operations used by the automated scheduling agent to collect the event information may depend on the medium that the event initiator used to contact the automated scheduling agent in the previous operation. Regardless of the collection operation used, event descriptions may include both required and optional parameters.

Examples of required parameters may include Event Title, Event Duration, Event Location, Candidate Time Frame(s), and Invitees. Other implementations may use these and/or other factors to establish an event.

Similar examples of optional parameters may include: File Attachment(s), and Personal Message. Additional required and optional parameters may be determined by the medium that the event initiator used to contact the automated scheduling agent (e.g., a voice session established using a wireless phone). Certain types of events may have additional factors that should be considered in establishing an event. For example, establishing a lunch meetings may involve consideration of dining factors (e.g., cuisine, price, location).

Event Creation Via Telephone or Other Voice System

The event initiator may contact the automated scheduling agent using a telephone (e.g., a wireless phone) or other device capable of sending and receiving voice (such as a computer or PDA equipped with speaker and microphone) (301).

The automated scheduling agent provides an auditory prompt and records an event title provided by the event initiator (302).

The automated scheduling agent asks the event initiator to provide the duration of the event (303). The event initiator then responds with the duration of the event. For example, an event initiator may say or select present options to reflect that the event lasts three hours. The automated scheduling agent may be configured to accept durations of varying lengths, or it may be configured to accept duration of predefined durations.

The automated scheduling agent prompts the event initiator to specify at least one time frame during which to schedule the event. A time frame may be configured with a start time (304) and an end time (305). The event initiator may specify more than one time possible frame for an event, if desired. For example, the event initiator may ask the automated scheduling agent to schedule a meeting on Wednesday between 1300 and 1700 or Thursday between 0900 and 1200.

In yet another implementation, the event initiator may indicate a preference value for each time frame (e.g., High, Medium, Low).

In addition, the automated scheduling agent then may prompt for and record a location for the event (306). The location may include a physical location, a server, a virtual location (e.g., an electronic conference hosted on a server), a teleconferencing session, or other resource. In one implementation, enabling a user to specify a location includes enabling the user to request allocation of a resource. For example, a user may request a reservation for a meeting room, or allocation of communications and/or processing resources.

The automated scheduling agent also may ask the event initiator if they wish to record a Personal Message (or other optional information) to accompany the event invitation (307). If the event initiator responds in the affirmative, the automated scheduling agent prompts for and records the optional information (308). For example, an event initiator may record their description of the proposed event (believing that some invitees respond better to a message from an actual person's voice instead of computer-generated speech).

The automated scheduling agent then asks the event initiator for invitees (309-312). If desired, invitees may be classified according to some priority scheme (e.g., Mandatory or Optional, High/Med/Low priority, etc.).

One implementation may schedule events around mandatory/optional criteria. However, other criteria, priority schemes, organizing factors, and/or goals may be used to establish an event. For example, an automated scheduling agent may enable a user to schedule an event around a particular invitee or class of invitees, enable a user to specify dining parameters (e.g., a type of cuisine, neighborhood, or particular restaurant), enable the user to specify a preferred location and/or enable the user to specify attire.

In one implementation, the user is asked if they would like to specify other criteria. The automated scheduling agent then may walk the user through a sequence of one or more options. The user may answer yes or no to each option (or complete a form to indicate their preference), provide free form answers that are processed using a voice recognition engine, or respond to a series of questions of multiple choice options. If the user specifies a dining requirement (e.g., in response to the user requesting a lunch appointment), the automated scheduling agent then may query a reservation database to identify restaurant availability. In one configuration, the automated scheduling agent retrieves a list of available dining reservations and uses the list of available dining reservations as a set of potential time frames when invitees are interrogated.

The automated scheduling agent determines if there are any mandatory invitees (309) and iteratively records the information for each mandatory invitee (310). Determining if there are mandatory invitees may include recording the invitee's name, determining if that invitee exists in the event initiator's address book, and collecting contact information for the invitee if they are not already in the address book. If multiple operations for contacting the invitee exist in the address book (e.g., multiple phone numbers, email addresses, etc.), the automated scheduling agent may prompt the event initiator for the desired method(s) to use.

If the invitee did not previously exist in the event initiator's address book, the invitee may be added the address book for future reference, including contact information provided by the event initiator.

The automated scheduling agent may determine if there are any optional invitees (311) and iteratively record the information for each in a manner similar to that of the mandatory invitees (312). User preferences may be expressed on a graded scale (e.g., 0-10 or No, strongly dislike, dislike, mildly dislike, acceptable, favor, strongly favor, required). The event initiator may enable invitees to provide granular answers using a graded scale, or may simplify the scheduling processing by using yes/no responses.

Alternatively, the automated scheduling agent may combine operations (309, 310) and (311, 312) and differentiate between mandatory and optional invitees by asking the event initiator to specify for each invitee if they are mandatory or optional (or which of the appropriate categories the invitee belongs to if the event is using some other invitee classification scheme).

Once invitee information has been collected, the automated scheduling agent may provide an event summary (319) and ask the event initiator to confirm the event details. Alternatively or in addition, each detail may be confirmed incrementally as it is collected.

The operations of FIG. 3, for instance, operations 302, 303, 304, 306, (309), 310, 311 and 312 may be performed independently and/or performed in a different sequence.

An illustration of an exemplary dialog between an event initiator and the automated planning agent appears in FIG. 8, illustrating several of the operations described within respect to FIG. 3.

Event Creation Via Web Page or Software Application Based Form

The event initiator may contact the automated scheduling agent using a web browser that requests a web page from a server. Alternatively, the event initiator may contact the automated scheduling agent using a different software application. For example, the event initiator may be presented with a form or series of forms that request the necessary event information (314).

The form(s) may be described in HTML or XML format such that the form is able to automatically validate some of the data entries (315). For example, the form may be able to detect if the event initiator specifies a time frame for the event in which the end time is before the start time or a time frame is shorter than the event duration. If such an error is detected, the form may alert the event initiator to the problem and ask them to re-enter the information (316).

The form(s) may be configured to collect event information that is described above in Event Creation via telephone or other voice system. For example, the event initiator provides the information as text entered into the form or through a file attachment(s).

In addition, file attachments and typed text may be provided when performing event creation via a web page or software application. For example, the event initiator may elect to include a meeting agenda, documents for invitees to review ahead of time, a map to the event location, and/or other information. In another example, the event information may be linked to the availability of a resource, such as a tee time or a conference room.

As with other event creation operations, the event initiator may be presented with an event summary (319) to review and amend before completing the event creation operation.

Event Creation Via Electronic Message

The event initiator may contact the automated scheduling agent using an electronic message such as Email or Instant Message (317). In this case, the event initiator may provide event information within the electronic message.

The automated scheduling agent decodes the electronic message to extract relevant event information and determine if the message is valid (318). If a message is not valid, it may be discarded.

Each field of information may be identified by a specific keyword, tag, or other syntax, such as TITLE, DURATION, LOCATION, etc. followed by, corresponding data. An example of such a message using keywords appears in FIG. 9. In one implementation, the existence of key terms in a title or specified attendees in a title is used as the basis to trigger a particular configuration in the scheduling process. For example, in response to detecting "golf" in a title, an invitation using a golfing template may be retrieved. Use of the golfing template may invoke a code segment configured to suggest local courses as a location, ask whether nine or eighteen holes are desired, suggest a duration based on event initiator's specification of the particular type of event (e.g., 3 hours for nine holes, six hours for eighteen holes), and retrieve available tee times from local courses (or courses associated with the event initiator). In one implementation, the golfing template reduces the size of potential invitees to other golfers (as specified in a user tag or as identified from past golfing invitations). Thus, an event initiator calling an automated scheduling agent to set up a round of golf with friends saying "Golf" may be presented with a list of suggested tee times for a particular course. After expressing a preference for one or more tee times, the user then may be presented with a suggested group of golfers based, for example, on invitees the user has previously sent golfing invitations. The user may edit or confirm the list of invitees and instruct the automated scheduling agent to solicit participation.

Alternatively, the event creation message may follow a specific format where each field is delimited by a special character such as a comma, period, or tab.

Query Invitee Availability

Figure 4:
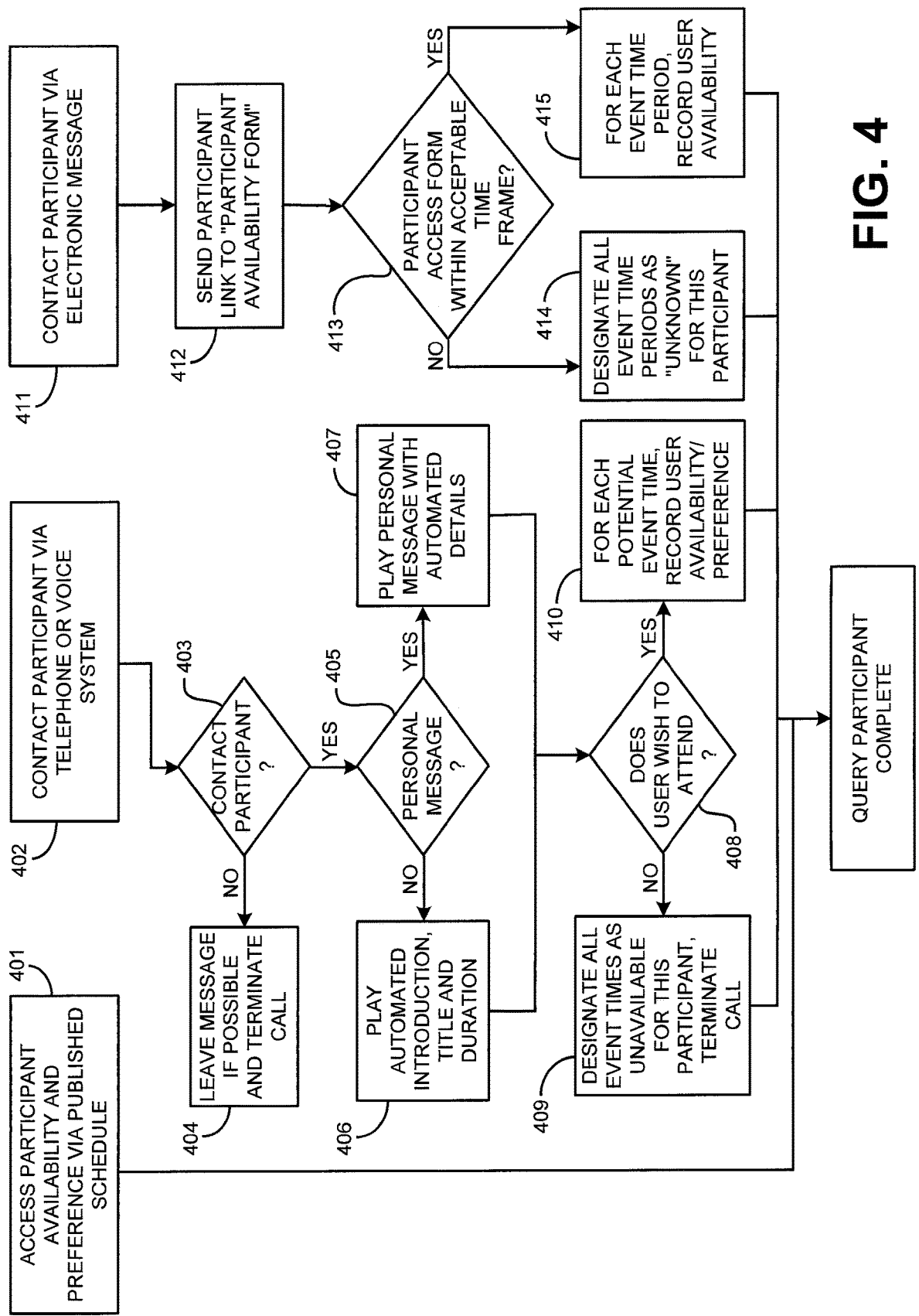
FIG. 4 is a flow chart of an exemplary process by which an invitee may be queried as to their availability for an event.

Exemplary operations for querying invitees for availability (103) are described in greater detail in FIG. 4. Querying invitees for availability may include gathering availability information from invitees for the time frame(s) proposed by the event initiator. The invitee may classify one or more time frames (or portion of a time frame) simply as Available/Unavailable or they may use a preference scale such as High, Medium, Low, or Unavailable.

The automated scheduling agent may, e.g., incorporate or have access to (e.g. via Microsoft Exchange Server) published schedules for some or all of the invitees (401). If an invitee's schedule is published and available, the automated scheduling agent automatically queries the invitee's availability from the published schedule. If a schedule is not available for an invitee, the automated scheduling agent then may contact the invitee to determine their availability.

The operations for contacting an invitee may be determined by the contact information stored in the event initiator's address book entry for that invitee.

If multiple contact information entries exist for an invitee (e.g. telephone, Email, Instant Message), the automated scheduling agent may select a mode of contact based on various criteria, including designation by the contact information of an entry that is designated "primary." Alternatively, if multiple contact information entries exist for an invitee, the automated scheduling agent may use a contact mode designated in the event creation operation (102).

In yet another implementation, the automated scheduling agent may select the contact mode based on criteria specified by the system (e.g. a default medium such as wireless phone, a lowest cost option first using email, a faster medium such as electronic messaging, and/or a more reliable medium).

In still another implementation, the automated scheduling agent may select a contact mode or multiple contact modes based on event urgency (e.g. the first potential event time is less than 24 hours away). For example, when the event initiator requests to schedule an event in less than an hour, the automated scheduling agent may simultaneously use email, instant messaging, and voice communications in order to schedule an event. The contact mode to schedule and/or remind users may be based on the priority of the event and/or the proximity of the event. For example, as a scheduled event is one week away, email may be deemed less intrusive and thus preferred to remind users about the scheduled event. As time passes and/or thresholds of invitees fail to respond to reminder messages, the contact mode may use more intrusive modes, such as using instant messaging, or calling invitees. In one implementation, the contact mode varies with time and percentage of invitees acknowledging communications. For example, email messaging may be used so long as 90% invitees respond at least five days before an event. Telephone calls may be used if less than 50% of invitees respond three days out and 70% of invitees respond less than two days out.

Query Invitee Availability Via Telephone or Other Voice System

If the selected contact method for an invitee is by telephone (402), the automated scheduling agent calls the invitee (403).

If the invitee is not available to take the call, the automated scheduling agent may attempt to leave a message describing the event that it is trying to schedule (e.g., using the event Title and Personal Message) and asking the invitee to return the call (404). The automated scheduling agent may provide a phone number and a unique extension or password so that the invitee can be correctly identified when the call is returned. Alternatively, when leaving a message, the automated scheduling agent may provide a unique URL (web address) that the invitee uses to indicate their availability as described below with respect to "Query invitee availability via electronic message."

If the invitee does take the call or when the invitee returns the original call (405), the automated scheduling agent will provide an introduction that may include the event initiator's name, the event name and personal message if one was provided (406, 407). The automated scheduling agent then asks the invitee if they are interested in attending the event (408).

If the invitee declines, the automated scheduling agent designates one or more potential event times as unavailable for that invitee and concludes the call (409).

If the invitee indicates interest in attending the event, the automated scheduling agent determines the invitee's availability for at least some of the time frames that the event initiator specified (410).

If the invitee is not available for the entirety of one or more of the time frames, the automated scheduling agent attempts to determines which portions of the time frame the invitee is available for.

For each time frame that the invitee indicates availability, the automated scheduling agent may ask if the invitee would like to indicate a preference. An exemplary dialog for this process is shown in FIG. 10.

An automated scheduling agent may configure varying levels of granularity. For example, an event may start by specifying preferences for a particular week, and then specify preferences for a particular day within the week. If the user does not prefer available a particular time frame (e.g., week or day), the automated scheduling agent may suspend invitee interrogation on the non-preferred time frame. The user then may specify preferences for particular time slots on a preferred (or available) day.

The automated scheduling agent may be configured to learn a user's vocabulary and/or configure a grammar responsive to an invitee's (or an event initiator's) usage. More precisely, an automated scheduling agent may determine that an event initiator only uses certain vocabulary terms in conjunction with one another (e.g., only schedules golf events after "Jim" is listed as an invitee). An automated scheduling event may load a golfing grammar and/or template in response to determining that Jim has been invited to an event. In another configuration, the grammar may be associated with the type of template that has been invoked (e.g., use a restaurant grammar and vocabulary in response to determining that lunch is being scheduled).

Query Invitee Availability Via Electronic Message

If the selected contact method for an invitee is by electronic message (or web page), the automated scheduling agent composes and sends an electronic message to the invitee (411).

The electronic message may include the event initiator's name, event description, and personal message, if available. The electronic message also may include a unique Uniform Resource Locator (e.g., web address) that the invitee may use to access the automated event scheduling system so that the invitees may indicate their availability and preferences (412).

Alternatively, the electronic message may include a phone number and unique extension or password that the invitee could use to indicate their availability as described above in "query invitee availability via telephone or other voice system."

When the invitee responds to the electronic message by accessing the URL, the invitee may be identified by the unique URL that was assigned to them.

Alternatively, the invitee may be identified by confirming their name or contact information.

If the invitee fails to access the designated URL within a pre-determined period of time (413), proposed time frames for the invitee may be designated with a particular value (e.g., unavailable or unknown) for that invitee (414).

Alternatively, upon accessing the designated URL within the pre-determined period of time, the invitee is presented with the time frames for the event. The invitee indicates their availability/preference for one or more of the time frame. Invitees may indicate different availability/preference values for separate portions of a time frame, if desired.

Once an availability/preference has been indicated for at least some of the time frames, the automated scheduling agent stores the information and schedules the event (415).

Coordinate Invitee Availability

Figure 5:
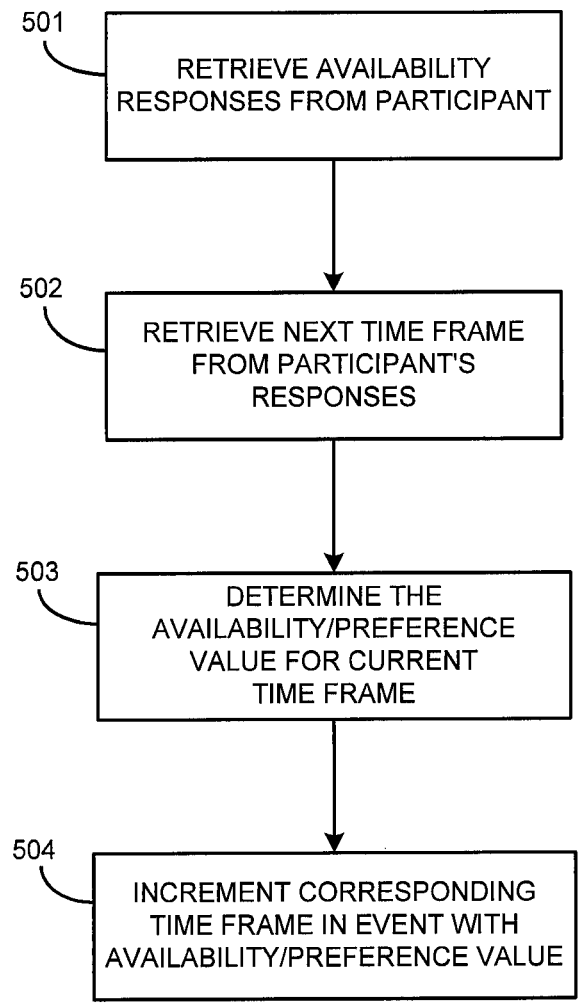
FIG. 5 is a flow chart of an exemplary process by which availability of multiple invitees is coordinated.

Coordinating the availability of each invitee (104) is illustrated through the exemplary flowchart shown in FIG. 5. In coordinating invitee availability, the availability and preference values for at least some of the invitees are related to determine an overall availability and preference value for the event time frames.

As shown, one or more invitees contribute a value to the overall availability/preference value according to a formula or table. The formula or table may be specified by the event initiator or may be a default property intrinsic to the automated scheduling agent or event type. The formula may consider factors that may include, but are not limited to, the invitee's classification (e.g., mandatory/optional, high/med/low, etc.) and/or invitee's preference for a particular time frame.

Availability responses are retrieved from an invitee. For each event time frame in an invitee's response (502), an automated scheduling agent calculates the appropriate availability/preference value may be calculated from a formula or table (503).

An exemplary table of availability/preference values and their application in hypothetical scheduling scenarios is shown in FIG. 11.

The availability/preference value may be proportional to the invitee's importance (where higher importance results in a higher increment) and/or inversely proportional to the invitee's preference for the event time (where lower preference results in a higher increment). For example, the lower the cumulative event time frame's value, the more desirable the proposed timeframe is to the entire group of invitees.

Select Optimal Event Time

Figure 6:
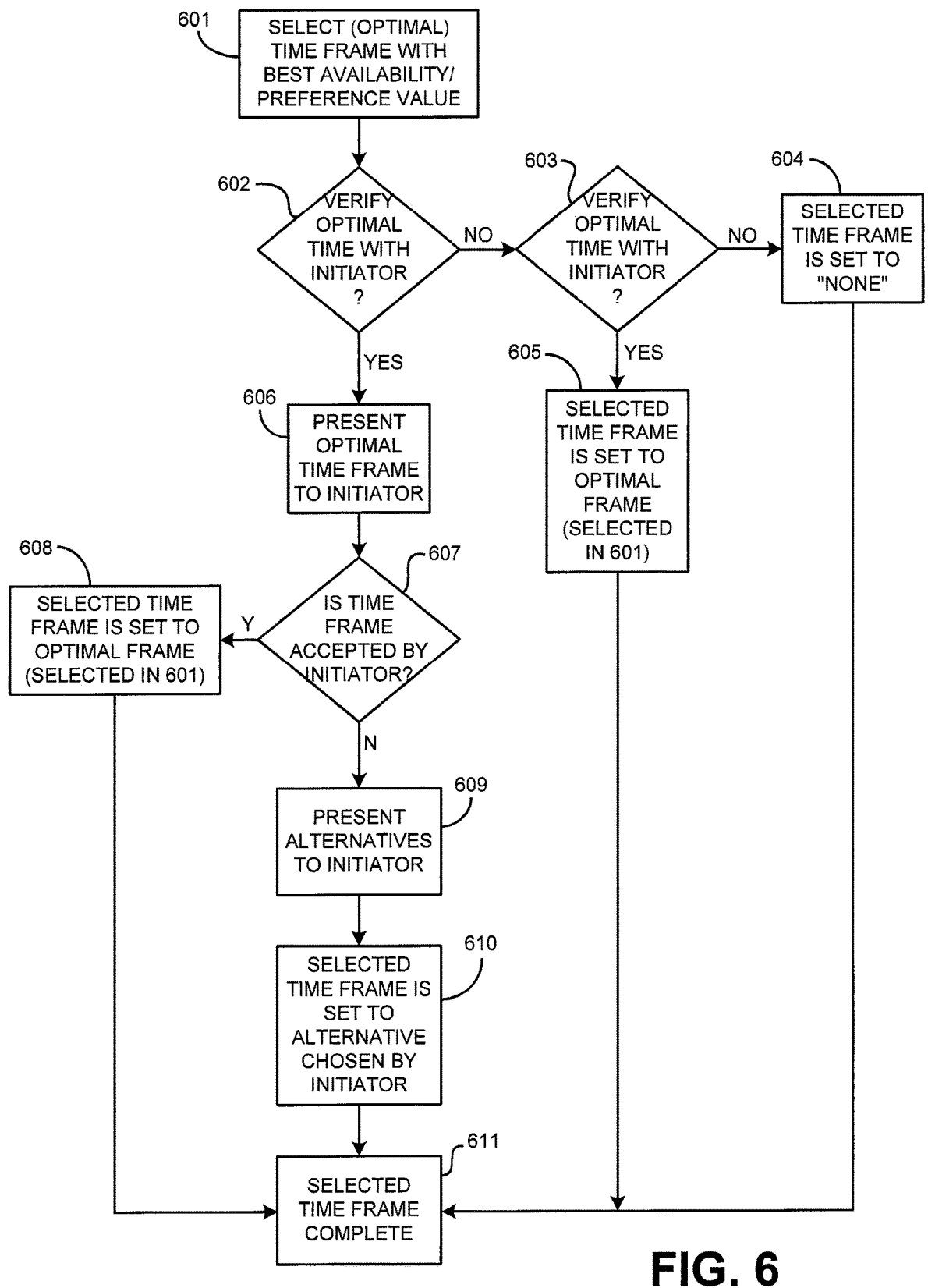
FIG. 6 is a flow chart of an exemplary process by which an event time most responsive to an establishment threshold is selected based on a formula or table.

The next operation in scheduling an event is selecting the optimal event time (105), an example of which is described in greater detail with respect to FIG. 6. When selecting an optimal event time, one event time is selected for the proposed event. Alternatively, the automated scheduling agent may determine that no suitable time frame exists. Note that identifying an "optimal" event time may vary with the underlying configuration of the automated scheduling agent and/or factors specified by the event initiator. Generally, an event time is "optimal" when a proposed time frame's score, value, or threshold for event establishment is sufficient and closest to the realizing of an objective specified by a score and/or event establishment criteria. In one configuration, the optimal event time is the earliest occurrence of a time frame where all the mandatory invitees are able to attend. In another configuration, the optimal event time is the event time associated with the highest participation. In yet another configuration, the optimal event time may include the event time whose score is determined to be favorable to the largest number of important users. Note that multiple factors may be used in establishing an optimal event time (e.g., the earliest event time for event times whose preference values lie above an establishment threshold).

The automated scheduling agent may propose one or more event times (based on the overall availability/preference values) to the event initiator for selection/confirmation (606).

The event initiator may either accept the proposed event time (608), or reject it and choose an alternate (610).

The alternate event time frames may be presented to the event initiator based on their availability/preference values (601) and the optimal time is verified with the event initiator (602).

The event initiator has the option of rejecting all alternative time frames and designating the selected event time as "none."

Optionally, the automated scheduling agent may automatically select the optimal event time without confirming it with the event initiator. The automated scheduling agent may determine if the optimal time frame's availability/preference value meets a predetermined threshold (603).

If the threshold is met, the optimal event time is designated as the selected event time (605). If the threshold is not met, the event scheduling criteria have not been satisfied and the selected event time is designated as "none" (604).

In one implementation, an event is established so that the maximum number of invitees may attend. In another implementation, the event is established so that all the priority invitees (or the maximum number of priority invitees) may attend. Still yet another implementation may suggest a time that is favored by the largest number of invitees (or the largest number of priority invitees). Other implementations may establish an event to minimize the travel time (e.g., by establishing a time before invitees depart for the office and/or from the office for home), based on proximity to other events (e.g., as close as possible to other scheduled events) and/or based on compactness to minimize the overall span of time commitments for one or more users.

In one configuration, the establishment criteria are specified by the event initiator. In another configuration, the establishment criteria are specified by default (e.g., a board meeting template uses criteria required for a quorum).

Notify Invitees of Scheduled Time

Figure 7:
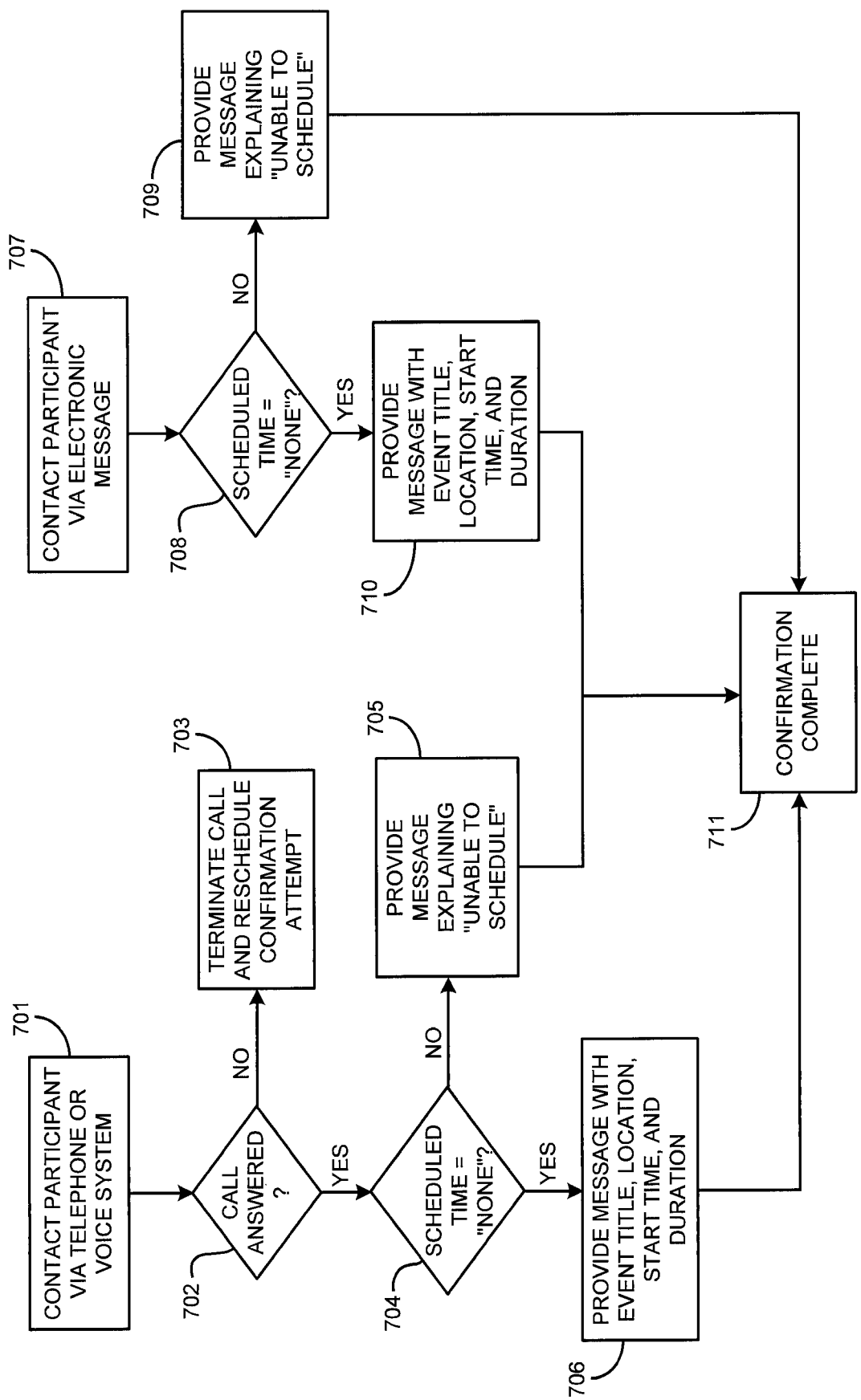
FIG. 7 is a flow chart of an exemplary process by which invitees may be notified of the selected event time most responsive to an establishment threshold.

Invitees (including the event initiator) may be notified, of the selected time (106) and shown in detail, for example, in FIG. 7.

The mode used to contact an invitee may be determined in the same way that the contact mode for querying availability was determined (see 403, e.g.). For purposes of enabling description, two modes are described (1) contact an invitee via telephone or voice system (701), and (2) contacting an invitee via electronic message (or interface).

First, the automated scheduling agent may contact the invitee by using a telephone or other voice system (701). If the call is not answered (702), the automated scheduling agent terminates the call and attempts to reach the invitee again later (703).

If the call is answered (702), the automated scheduling agent may confirm with the invitee the event title, location, start time and duration (706), or if the selected time was determined to be "none" (704, see 604, e.g.), the automated scheduling agent may tell the invitee that the event was unable to be scheduled (705).

Second, or alternatively, the automated scheduling agent may contact the invitee be means of electronic message (707). The electronic message may include the event title, location, start time and duration (710), or if the selected time was determined to be "none" (708, see 604, e.g.), the message may explain that the event was unable to be scheduled (709).

In either event, once the event initiator and all invitees have been notified, the confirmation process is complete (711).

Although one or more operations were described with respect to organizing an event around mandatory and optional invitees, events may be organized by organizing events with respect to other factors. For example, events may be organized around achieving a particular threshold for participation, or in response to the importance of a particular attendee.

Figure 12:
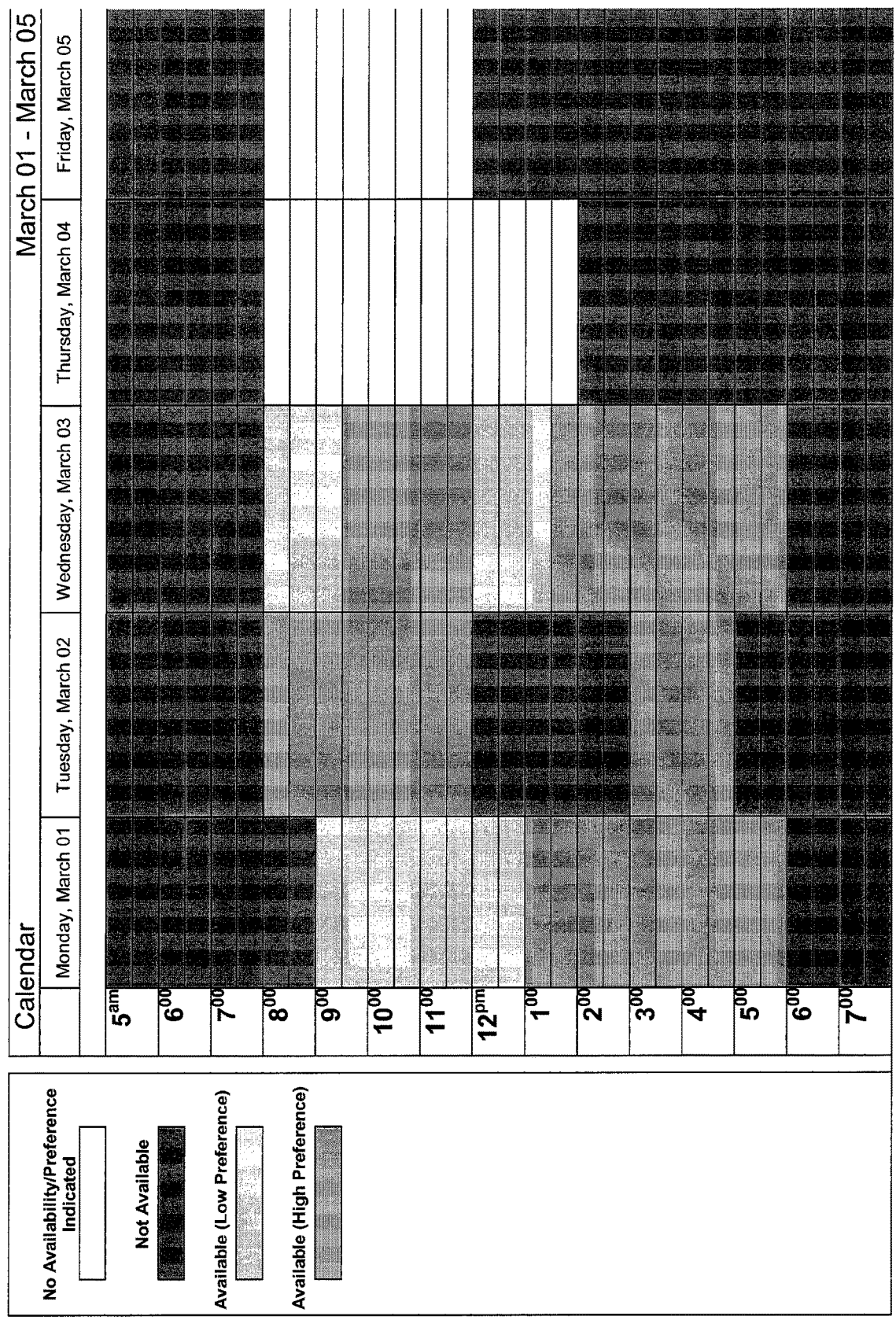
FIG. 12 is an exemplary graphical user interface that may be used to enable an invitee to specify their availability.

FIG. 12 is an exemplary graphical user interface (GUI) that may be used to enable an invitee to specify their availability. For example, an invitee may receive a message (e.g., an email, open a Java application, and/or open a web form) requesting availability for the next week. FIG. 12 may represent a GUI presented as operation 412 (from FIG. 4) is performed. The invitee then may modify the schedule to reflect their availability and/or preferences. In one implementation, the invitee may activate a selection tool across multiple times in indicate their preference for several time frames. For example, an invitee may "click" on not available button on the left, and then select and drag a cursor across multiple dates and/or times. The invitee then may select available times within the larger "Not Available" window to indicate when the invitee is available. The invitee also may specify the manner in which they are available. For example, the invitee may indicate their availability by phone but not in person.

Establishment of a contact order may be done in a structured (e.g., serial or two-by-two) manner in order to accomplish various event establishment objectives. In one example, the most important invitee is contacted first. Alternatively, the most distant users (e.g., traveling out-of-town users as identified by mailing address or telephone prefix) may be contacted earlier. Similarly, invitees with the longer travel times may be contacted earlier. Thus, an event initiator may determine that a desired invitee has an especially busy schedule or is extremely important. As a result, the automated scheduling agent may initially contact the desired invitee to determine their availability, even before the event initiator provides configuration information for the event. The desired invitee then may provide their availability so that the initiating invitee may survey the availability of the desired invitee. The event initiator then may further configure an event scheduling message using the availability of the desired invitee and the preferences of the event initiator.

For example, the dialog shown in FIG. 8 may be modified so that an event initiator may say, "schedule an event." The automated scheduling agent then may respond, "what is the purpose of the event?" The event initiator then responds, "Weekly Board meeting."

The automated scheduling agent then polls the event initiator, "how would you like the event scheduled?" The event initiator then responds, "poll USER_B first."

The automated scheduling agent polls USER_B to determine USER_B's availability and may report back to the event initiator than "USER_B is available at TIME_A on DATE1 and TIME_B on DATE2. Would you like to proceed with scheduling the event using USER'S's availability?"

The event initiator then responds, "Yes."

The automated scheduling agent then responds "Would you like to specify additional criteria?"

At this point, the event initiator may record a personal greeting indicating that the meeting is being organized around USER_B's limited availability, remove TIME_A on DATE1 from the list of available times, and proposed additional invitees.

Alternatively, the event initiator may provide a list of invitees and indicate an associated importance for one or more invitees. The automated scheduling agent then polls for availability of one or more invitees classified or determined to be "more important". The invitee availability of the more important invitees then may be presented to less important invitees to determine the availability of less important invitees and/or confirm attendance. The automated scheduling agent may be automatically configured to poll more important invitees before less important invitees without the event initiator providing an explicit instruction to interrogate more important invitees first. Rather, the automated scheduling agent may automatically determine that more important invitees should be interrogated first and their availability should be provided to less important invitees once invitee availability has been determined for more important invitees.

In another example, a contact order may be organized around the most constrained individual. For example, analysis of event establishment history may indicate that a specified user appears to be the most constrained user. In addition to using historical analysis to determine a degree of constraint, electronic calendars may be accessed to determine a degree of constraint (in addition to referencing an actual availability to avoid burdening an invitee). Thus, the burden of scheduling more difficult invitees may be reduced by using the availability of difficult invitees as a set of available times.

Alternatively, a contact order may be organized around the least-constrained individuals. For example, an organization attempting to establish an event with a quorum may poll those invitees that are most likely to attend to reduce the time, computational, and communications burden of establishing an event.

In yet another example, a contact order may be organized around invitee accessibility. For example, an invitee's history of responsiveness (e.g., degree of participation in the scheduling process) may be used to elevate or depress an invitee's status on the contact order. An automated scheduling agent trying to reduce communications costs (e.g., an amount or duration of calls that may be increased by invitee's use of answering machines) for an event with a threshold degree of participation may avoid contacting less-available users and contact more available users earlier. Similar in many respects to contacting non-constrained invitees, less accessible invitees may be contacted earlier if high degrees or participation is required, or if the invitee is a required attendee (likely requiring multiple attempts).

The automated scheduling agent may include a feedback mechanism to increase the likelihood of establish an event responsive to an organizing criteria. For example, the automated scheduling agent may determine the likelihood of establishing an event as invitees are responding to availability interrogation. In one instance, the automated scheduling agent contacts the event initiator with a message indicating, "it appears that scheduling an event using your event establishment criteria and/or organizing factor will be difficult. Can we alter the event establishment criteria to increase the likelihood of success?" If the event initiator accepts the recommendation, the event initiator then may specify different or additional times of availability, alter the importance of one or more organizing thresholds (e.g., participation threshold may be reduced from 70% to 50%, required invitees may be designated as optional invitees, and/or particular parameters may be reduced from high importance to lesser importance). The automated scheduling agent may suggest a proposed change that increases the likelihood of success. For example, the automated scheduling agent may include message to the event initiator that indicates, "you requested a 70% participation. This threshold appears difficult to attain. However, if you change this to 50% participation, it appears the event may be scheduled." Other suggestions may include changing the status or importance of one or more invitees (e.g., from a mandatory invitee to an optional attendee), propose additional times, or extend the latest date at which an event may be scheduled.

In yet another example, the automate scheduling agent may indicate that, although an event that satisfies the event establishment criteria cannot be scheduled, a particular event at a particular configuration (e.g., specified invitees and time(s)) appears most or sufficiently responsive to the event establishment criteria. For example, the automated scheduling agent may indicate that an event can be established at a first time with only one scheduling conflict with a required attendee. The event initiator then may indicate that the event should be scheduled at the first time and/or transmit a message to the invitee with the scheduling conflict requesting that the scheduling conflict be removed.

Figure 13:
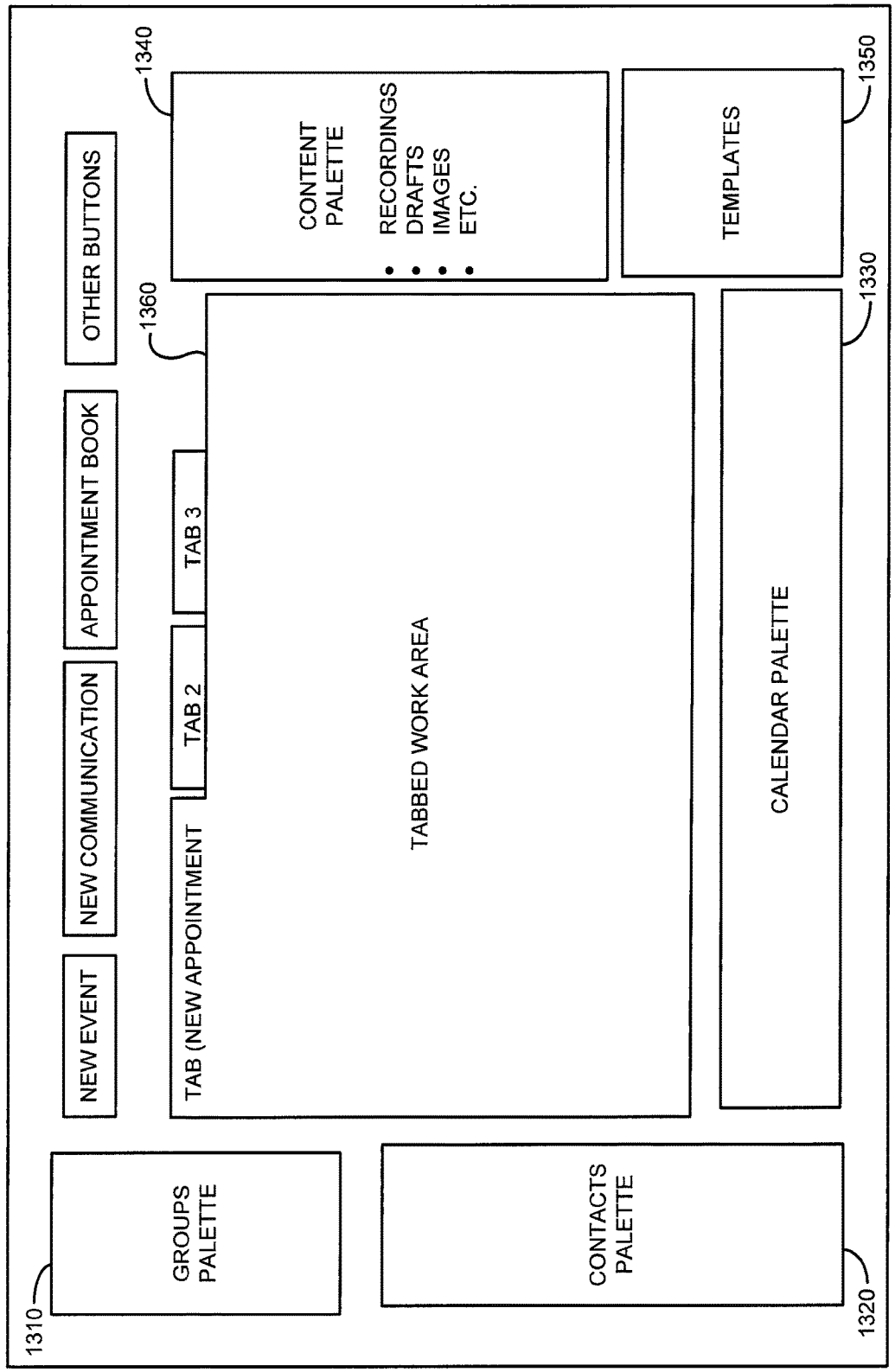
FIG. 13 is an exemplary graphical user interface that may be used to enable an administrator to configure events and communications.

FIG. 13 is an exemplary GUI 1300 that may be used to enable an administrator to configure events and communications. More precisely, GUI 1300 may be used to configure an automated scheduling agent that manages events and/or communications. As shown, GUI 1300 includes a "groups" palette 1310, a "contacts" palette 1320, a calendar palette 1330, a content palette 1340, a "templates" palette 1350, and a tabbed work area 1360. In one implementation, icons representative of data appearing in the different palettes (e.g., "groups" palette 1310, "contacts" palette 1320, a calendar palette 1330, a content palette 1340, or "templates" palette 1350) may be "dragged" from the palette and "dropped" into the tabbed work area 1360 to ease the administrative burden of configuring a task.

GUI 1300 may be configured to enable an automated scheduling agent to be "branded." For example, a business may find it desirable to present the business's identity as the source of messages, rather than the identity of an intermediary (e.g., a web portal) offering an automated scheduling agent. As a result, an administrator may configure a user interface for an automated scheduling agent to present a desired "look and feel" to users (e.g., customers and employees). In addition to business logos and images, an administrator may use GUI 1300 to provide varying degrees of customization and user perception into the scheduling process. For example, a first administrator may elect to provide users with a high degree of granularity and control in scheduling an event while a second administrator may desire to present a simpler interface. The simpler interface may represent a configuration as defined in a configuration, or it may represent a complex configuration that is transparent to a user, for example, by shielding the user from complex staffing requirements required to support a patient. In one implementation, data in each palette is shared among different users or even organizations. In another implementation, each palette is associated with a particular user.

"Groups" palette 1310 may be used to configure collection of users and may be used to reduce the administrative burden of configuring communications to multiple users. For example, members may be added or removed from a group. In one implementation, removal of a member from a group (or an event) may effect changes such that other parties leveraging the group (or participating in an event involving the group) perceive changes in group membership. For example, event attendees may receive a message that the removed user is no longer participating. Alternatively, another configuration may render the changes transparently so that members of the group do not receive notification or information related to the change in group membership.

"Contacts" palette 1320 may be used to manage information for contacts. For example, a contact may be added or a phone number or email address may be changed.

A calendar palette 1330 may be used to configure time settings for events and/or communications. For example, the calendar palette 1330 may be used to configure an appointment or schedule an event by dropping a time slot, date, or collection of dates into the tabbed work area 1360.

Content palette 1340 may be used to manage recordings, drafts, images and other content that are used in configuring events and/or appointments. For example, the content palette may be used to store frequently used messages, such as a message indicating that practice is cancelled.

"Templates" palette 1350 may be used to configure an event with common attributes. For example, templates palette may be used to create a recurring appointment opportunity (e.g., a daily open appointment in a physician's appointment book).

Tabbed work area 1360 may be used to configure new events, new communications, or appointments. For example, a user may "drag and drop" one or more icons from the peripheral palettes (e.g., contacts palette 1320) to configure an appointment with minimal interaction. The tabbed work area 1360 may include multiple tabs enabling a user to manage multiple events and/or communications simultaneously.

Figure 14:
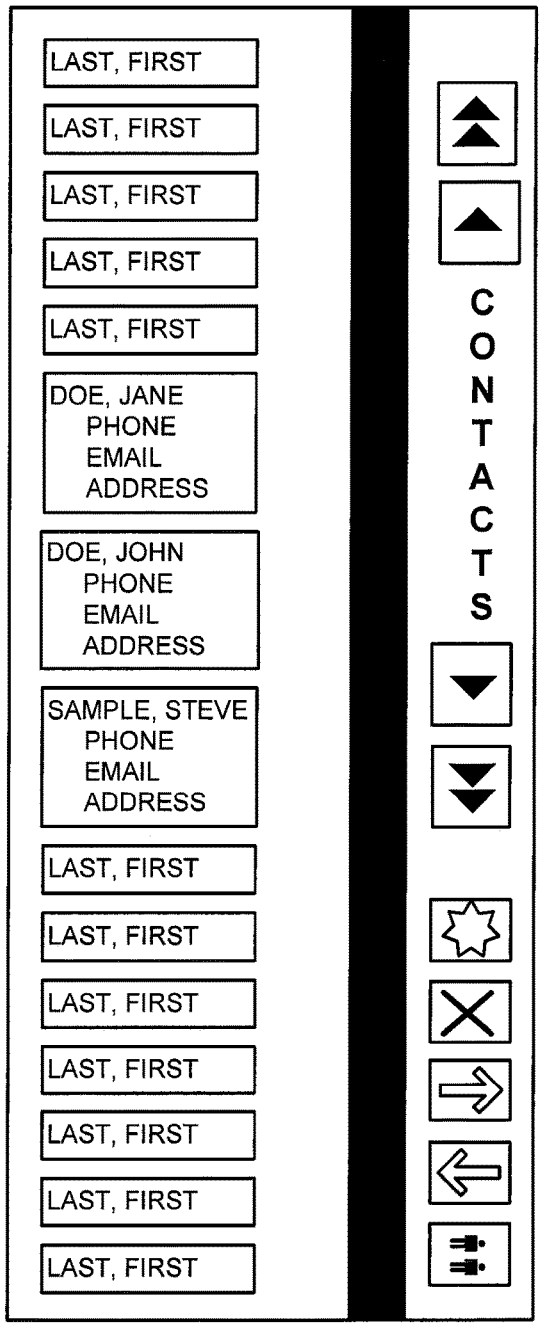
FIGS. 14 and 15 are exemplary palettes that may be included in a graphical user interface to manage contact and calendar information.
Figure 15:
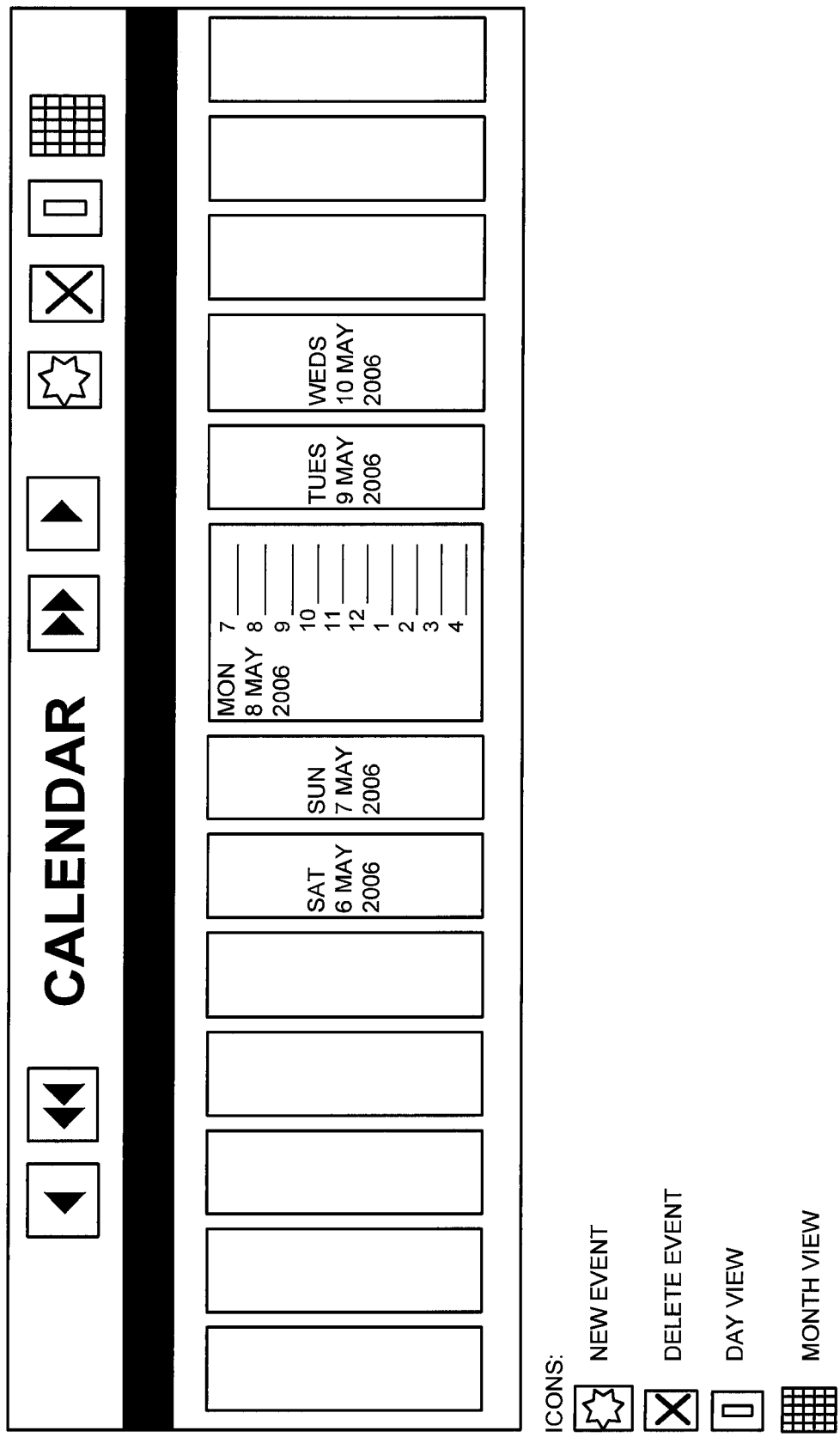

FIGS. 14 and 15 are exemplary palettes 1400, 1500 that may be included in a graphical user interface to manage contact and calendar information. As shown, GUI 1400 illustrates a "contacts" palette 1340 with expanded contact information (e.g., phone number, email, and address information) for contacts that are "in focus" while labels for users out of focus only feature name information. Similarly, GUI 1500 illustrates a "calendar" palette 1350 with different levels of calendaring information presented based on which dates are "in focus."

Figure 17:

FIGS. 16 and 17 are exemplary graphical user interfaces 1600, 1700 that may be used to configure a new appointment and a new communication. Typically, GUIs 1600 and 1700 are presented within a tabbed work area (e.g., tabbed work area 1360 described with respect to FIG. 13). GUI 1600 illustrates an exemplary display that may be presented enabling a user to configure an appointment. For example, GUI 1600 may be used by a massage therapist's office to enable patients to schedule an appointment during evening hours when a scheduling receptionist is no longer available. As shown, the appointment is 60 minutes long, is scheduled to start at 10:00 AM on 15 May 2006. The prospective customer is asked to provide information related to relevant medical conditions, and the "account owner" (e.g., the massage therapist and/or business manager) is notified via electronic mail messaging.

GUI 1700 illustrates a notification message that is sent via phone and email to three recipients that the game has been cancelled. The cancellation message reflects that events scheduled for June $1^{st}$, and June $8^{th}$ have been cancelled. A template may reduce a burden on an event initiator, for example, by auto-populating different parameters and/or values for the different parameters. Thus, an automated scheduling agent generating a golfing event may automatically retrieve specified parameters without requiring the user to walk through a more detailed process to generate the event.

FIG. 18 is an exemplary template that may be used to configure an appointment being managed through an automated scheduling agent. For example, an icon called "default template" may be dropped onto a tabbed work area in order to configure an appointment that is 30 minutes long, and asks the customer "Do you have any special instructions?" If the appointment is confirmed, the "Account Owner" is notified via email.

FIG. 19 is an exemplary calendar 1900 indicating which appointments have been scheduled using an automated scheduling agent. For example, a landscaping business may publish their appointment book to an Internet Web server so that customers may schedule appointments. The landscaping business also may enable a telephony-portal for the automated scheduling agent to interface with the appointment book so that customers may call or receive calls to schedule landscaping appointments.

As shown, appointments that are 'green' (or faded) illustrate open appointments while appointments that are 'red' or solid represent appointments that have been reserved. For example, a user requesting service may view the available appointments and select one of the appointments to reserve the appointment.

However, a business offering an interface to an appointment book is not required to commit to a particular time as the automated scheduling agent interfaces with the user. Rather, an indication of a tentative, proposed, or even general inquiry may be recorded and scheduled by the business. In one implementation, a user contacting the automated scheduling agent is polled about appointment availability as the automated scheduling agent proposes a sequence of available appointments. In another implementation, a user contacting the automated scheduling agent places a request for service without specifying a time. In any event, an administrator (e.g., an administrator for the landscaping business) may configure the request for service to occur at a particular time, and, as a result, the automated scheduling agent may contact the customer with a confirmed time.

Other implementations are within the scope of the following claims. For example, a type of event being created could be a meeting with different attendee types. In addition to "required" and "optional" types that have already been discussed above, other types may be used that represent roles like staff and customer for appointments.

In one implementation, an event that requires different types of staff for support may be configured to automatically invite and/or schedule support staff. For example, a certain type of medical procedure may require several different types of technicians for support. An automated scheduling agent may receive a request from a customer for the certain type of medical procedure. The automated scheduling agent then may begin polling the different types of employees in order to assemble the team required to perform the medical procedure. Once a team availability has been established (by confirming the time requested by the customer or by identifying an alternate time), an appointment may be confirmed with the customer. In another configuration, different employees from the specified types are automatically scheduled to support the customer's appointment.

An event may be configured to have no invitees or attendees other than the initiator defined at the time of event creation. For example, a business may offer appointments through an automated scheduling agent. A manager then may manually assign employees to individual appointments. Thus, additional invitees may be added to the event at a later time either by a manager manually configuring the appointment, or indirectly for example, when the invitee requests an available appointment slot, registers for an event, requests an invitation, and/or uses telephone network (or web portal). Alternatively or in addition, an initiator may manually add attendees at a later time.

In addition to a title and description, an event may have messages or questions that are associated with the event and provided to recipients at the time of the availability query (contact). Thus, an event may be generated in response to how messaging recipients respond to queries, such as a group polling, where certain results lead to certain event parameters (e.g., time of day, event location). In one implementation, an event is associated with a zero length duration in order to perform instantaneous operations used to deliver a message or ask a question of a group of people.

A group of invitees may be automatically named (e.g., "YES-RESPONDERS") for later reference based on some property (e.g., attendance at event and/or response to an associated question). The dynamically generated group may be used to reduce the administrative burden of performing additional actions, such as distributing meeting minutes, or to schedule a follow-up meeting.

Invitees (e.g., contacts) may be stored within a system within the control and/or administration of an automated scheduled agent system. Alternatively, the contacts may be imported from external data sources, and/or dynamically generated. Examples of external data sources may include a messaging application (e.g., Outlook or a web-based email account), a 3$^{rd}$ party database or spreadsheet (e.g., a vehicle database service such as Reynolds and Reynolds), and/or contact lists provided by a contact list provider.

The automated scheduling agent may be configured to interface with existing communications infrastructure to reduce the cost and/or burden. For example, a task to related to the placement of calls and electronic mail messages may be directed to an organization with an outbound calling system (e.g., a large communications carrier).

The automated scheduling agent may maintain a calendar of events that have been completed (or scheduled) and present the calendar to the user in chronological fashion. The calendar of events enables a user or administrator to visualize past and future activity. The calendar may be published on a web site to advertise scheduled events or enable users to reserve publicly available appointments.

In one implementation, an automated scheduling agent enables published calendars to be searched so that prospective customers can search for open appointments or events that respond to user-specified criteria. Alternatively, a prospective customer may enter a generic query without specifying a particular time. For example, an intermediary may create a list of local businesses that provide a specific type of service. A user then may configure a search query to request support from one of the local businesses. The intermediary then processes the query, and identifies businesses able to support the user. The intermediary, using, for example, an automated scheduling agent, begins contacting the identified businesses to determine whether a local business is able to support the user. For example, the intermediary may ask the recipient if they are available immediately for an emergency repair or deliver a message instructing them to reply if they are interested in obtaining more information about a potential job. For instance, the automated scheduling agent solicits bids for a job.

The list of local businesses may be generated by an automated web collection agent (e.g., a 'bot' or 'crawler'). Alternatively, the list of local businesses may be generated and administered by a directory service provider and may require a subscription and/or participation in a referral program.

In one implementation, the list of contacts generated by such an activity may be hidden from the user that requested the search. An intermediary then may provide only the results for those contacts that responsive to the user's query. For example, the user then may be provided with a list of one or more businesses that were responsive to inquiries by the automated scheduling agent, answered the question appropriately, agreed to pay a fee for the referral, and was responsive to the conditions in the user's query. In one implementation, the intermediary identifies businesses that have registered with the intermediary and agree to the specified referral policy (e.g., set up an account with the intermediary operating the automated scheduling agent). In another implementation, the intermediary may initially identify businesses for a limited promotional effort (e.g., by enabling the business to participate in a limited number of referrals). If the business fails to register and/or provide a referral fee, the intermediary may stop identifying the business as the list of businesses are being generated.

Although various operations may reference various actors such as an event initiator (a user proposing an event), an invitee (a user invited or requested to participate in an event), and a participant (a person attending an event), operations described with respect to one of the actors may be performed with other actors. For example, although an invitee may have been described as receiving notification reminders, a participant also may receive notification reminders (e.g., to schedule follow up events or receive updates as an event is in progress). Similarly, an administrator (e.g., supervisor) coordinating employee schedules may configure the automated scheduling agent to process employees as invitees, regardless of whether participation is mandatory, encouraged, or optional.

An automated scheduling agent may be configured to delegate to another communications address and/or schedule a call at a later time. For example, a busy individual that relies on an assistant to schedule all appointments may speak "delegate to (YYY) 555-1212" or "delegate to assistant" to route the availability request to the specified contact information (e.g., (YYY) 555-1212) or an email or instant messaging address) or an assistant. The automated scheduling agent may process "delegate" as a "break in" command that interrupts the normal event scheduling process. Alternatively, the invitee may speak "call me later" to configure the automated scheduling agent to call at a later time, possibly invitee-specified, so that the user may access a currently-inaccessible calendar.

What is claimed is:

1. A method of scheduling an event using one or more computers, the method comprising:
   establishing, by the one or more computers, an interactive voice session between an event initiator and an automated scheduling agent residing on a host;
   receiving, by the one or more computers and by an interactive voice response system, an instruction from the event initiator to generate an event requiring an allocation of telecommunications resources;
   interrogating, by the one or more computers, the event initiator to verbally identify one or more invitees for an event;
   referencing, by the one or more computers, contact information for each of the one or more invitees;
   configuring, by the one or more computers, the automated scheduling agent to interface with an network;
   using, by the one or more computers, the automated scheduling agent to establish a second voice session with at least a first invitee, from a list of the one or more invitees, and, in the second voice session, to contact the at least first invitee, from the list of the one or more invitees, with a message that elicits invitee availability;
   analyzing, by the one or more computers, one or more free form voice responses to the message according to a priority scheme having one or more priority levels, wherein the one or more priority levels include a priority level for the first invitee;
   based on analyzing the one or more free form voice responses to the message, identifying, by the one or more computers, an establishment setting for the event that accounts for at least one priority level of the one or more priority levels, wherein the at least one priority level is associated with the one or more free form voice responses; and
   generating, by the one or more computers and using the establishment setting, the event allocating telecommunications resources.

2. The method of claim 1 further comprising:
   based on the one or more free form voice responses, recording one or more invitee time preferences corresponding to at least the first invitee;
   recording an event initiator time preference;
   adding the establishment setting to establishment criteria for the event;
   determining a set of one or more available times that each satisfy the establishment criteria; and
   scheduling the event at one of the available times from the set of the one or more available times.

3. The method of claim 2 wherein adding the establishment setting to the establishment criteria for the event comprises adding the event initiator time preference to the establishment criteria by:
   for at least two members of a group that includes at least the first invitee and the event initiator, referencing user availability based at least in part on (i) the event initiator time preference or (ii) the one or more invitee time preferences; determining whether the establishment criteria supports adding the event initiator time preference to the set of one or more available times;
   based on a determination that the establishment criteria supports adding the event initiator time preference, adding the event initiator time preference to the set of one or more available times; and
   reducing the set of one or more available times in accordance with the event initiator time preference such that the reduced set of one or more available times include only those times that are consistent with the event initiator time preference.

4. The method of claim 3 comprising:
   determining that at least one of the one or more invitees is an optional attendee; and
   for each optional attendee, configuring the establishment criteria so that the set of one or more available times is not reduced in accordance with a time preference of the optional attendee.

5. The method of claim 2 wherein adding the establishment setting to the establishment criteria for the event comprises adding the invitee time preference of the one or more invitee time preferences to the establishment criteria by:
   determining that at least one of the one or more invitees is a mandatory attendee; and
   for each mandatory attendee, configuring the establishment criteria so that:
      a time preference for the mandatory attendee is added to the set of one or more available times; and
      the set of one or more available times is reduced in accordance with the time preference for the mandatory attendee such that the reduced set of one or more available times include only those times that are consistent with the time preference for the mandatory attendee.

6. The method of claim 2 further comprising using event establishment criteria by:
   referencing the set of one or more available times;
   comparing the set of one or more available times with a threshold for participation in the event establishment criteria; and
   scheduling the event when results of the comparison of the set of one more available times with the threshold for participation supports scheduling the event.

7. The method of claim 1 further comprising:
   determining establishment criteria for the event using the establishment setting and one or more event initiator preferences;
   based on the establishment criteria, determining that the event cannot be scheduled;
   determining a factor around which the one or more event initiator preferences may be measured;
   relating the one or more event initiator preferences using the factor; and
   identifying a time determined to be most responsive to the factor.

8. The method of claim 1 wherein generating, using the establishment setting, the event allocating telecommunications resources includes providing access to a server based on the establishment setting.

9. The method of claim 1 wherein generating, using the establishment setting, the event allocating telecommunications resources includes providing access to a virtual location based on the establishment setting.

10. The method of claim 1 wherein generating, using the establishment setting, the event the event allocating telecommunications resources includes providing access to a virtual location of an electronic conference hosted on a server based on the establishment setting.

11. The method of claim 1 wherein generating, using the establishment setting, the event requiring the allocation of telecommunications resources includes generating a teleconferencing session based on the establishment setting.

12. The method of claim 1 wherein:
   receiving the instruction comprises:
      detecting a key term, and
      based on detecting the key term, identifying a template for a message used to contact at least the first invitee; and
   using the automated scheduling agent to contact at least the first invitee comprises generating the message that elicits invitee availability using the template.

13. The method of claim 1 wherein receiving the instruction comprises detecting a key term; and
   wherein interrogating the event initiator to verbally identify one or more invitees for the event comprises verbally identifying the one or more invitees for the event based on verbal recognition of the key term.

14. The method of claim 1 further comprising allocating the telecommunications resources with the establishment setting.

15. The method of claim 1, wherein using the automated scheduling agent to contact at least the first invitee, from the list of the one or more invitees, with the message that elicits invitee availability comprises using the automated scheduling agent to contact the first invitee before contacting a second invitee based on the priority scheme providing that the first invitee belongs to the priority level for the first invitee and that the second invitee belongs to a second priority level that has a lower priority than the priority level for the first invitee.

16. The method of claim 1, wherein identifying the establishment setting for the event comprises one or more of:
   identifying a date for the event when most of the invitees associated with the one or more responses are available;
   identifying a location for the event that is preferred by most of the invitees associated with the one or more responses, or that minimizes travel time for most of the invitees associated with the one or more responses; or
   identifying a time for the event when most of the invitees associated with the one or more responses are available, or that is preferred by most of the invitees associated with the one or more responses.

17. The method of claim 1, comprising assigning the first invitee to the priority level for the first invitee and a second invitee of the one or more invitees to a second priority level based on one or more of:
   a determination that the first invitee is located farther from a location corresponding to the event than the second invitee;
   a determination that the first invitee has a longer expected travel time to a location corresponding to the event than the second invitee; or
   a determination that the first invitee has been labelled as a priority invitee.

18. The method of claim 1, wherein using the automated scheduling agent to contact at least the first invitee comprises using the automated scheduling agent to contact all invitees, from the list of the one or more invitees, that belong to the priority level for the first invitee as indicated by the priority scheme.

19. A system comprising:
   one or more computers; and
   one or more storage devices storing instructions that are operable, when executed by the one or more computers to cause the one or more computers to perform operations comprising:
      establishing, by the one or more computers, an interactive voice session between an event initiator and an automated scheduling agent residing on a host;
      receiving, by the one or more computers, an instruction from the event initiator to generate an event requiring an allocation of telecommunications resources;
      interrogating, by the one or more computers, the event initiator to verbally identify one or more invitees for an event;
      referencing, by the one or more computers, contact information for each of the one or more invitees;

configuring, by the one or more computers, the automated scheduling agent to interface with an network;

using, by the one or more computers, the automated scheduling agent to establish a second voice session with at least a first invitee, from a list of the one or more invitees, and, in the second voice session, to contact the at least first invitee, from the list of the one or more invitees, with a message that elicits invitee availability;

analyzing, by the one or more computers, one or more free form voice responses to the message according to a priority scheme having one or more priority levels, wherein the one or more priority levels include a priority level for the first invitee;

based on analyzing the one or more free form voice responses to the message, identifying, by the one or more computers, an establishment setting for the event that accounts for at least one priority level of the one or more priority levels, wherein the at least one priority level is associated with the one or more free form voice responses; and generating, by the one or more computers and using the establishment setting, the event allocating telecommunications resources.

20. A non-transitory computer-readable storage medium comprising instructions that, when executed by one or more computers, cause the one or more computers to perform operations comprising:

establishing, by the one or more computers, an interactive voice session between an event initiator and an automated scheduling agent residing on a host;

receiving, by the one or more computers, an instruction from the event initiator to generate an event requiring an allocation of telecommunications resources;

interrogating, by the one or more computers, the event initiator to verbally identify one or more invitees for an event;

referencing, by the one or more computers, contact information for each of the one or more invitees;

configuring, by the one or more computers, the automated scheduling agent to interface with an network;

using, by the one or more computers, the automated scheduling agent to establish a second voice session with at least a first invitee, from a list of the one or more invitees, and, in the second voice session, to contact at least the first invitee with a message that elicits invitee availability;

analyzing, by the one or more computers, one or more free form voice responses to the message according to a priority scheme having one or more priority levels, wherein the one or more priority levels include a priority level for the first invitee;

based on analyzing the one or more free form voice responses to the message, identifying, by the one or more computers, an establishment setting for the event that accounts for at least one priority level of the one or more priority levels, wherein the at least one priority level is associated with the one or more free form voice responses; and generating, by the one or more computers and using the establishment setting, the event allocating telecommunications resources.

* * * * *